United States Patent [19]
Vannatta et al.

[11] Patent Number: 5,999,832
[45] Date of Patent: Dec. 7, 1999

[54] METHOD OF AND APPARATUS FOR CONTROLLING A TRANSMIT POWER OF A COMMUNICATION DEVICE

[76] Inventors: Louis J. Vannatta, 4712 Wild Cherry, Crystal Lake, Ill. 60012; William P. Alberth, Jr., 1471 Woodscreek Cir., Crystal Lake, Ill. 60014

[21] Appl. No.: 08/904,205

[22] Filed: Jul. 31, 1997

[51] Int. Cl.$^6$ .................................................. H04M 11/00
[52] U.S. Cl. ............................ 455/575; 455/38.3; 455/69
[58] Field of Search .................................. 455/13.4, 38.3, 455/126–127, 343, 522, 572–575, 90; 320/106–107

[56] References Cited

U.S. PATENT DOCUMENTS

| D. 376,127 | 12/1996 | Nagele et al. ........................ D13/103 |
| 4,636,741 | 1/1987 | Mitzlaff ................................. 455/127 |
| 5,164,652 | 11/1992 | Johnston et al. ........................... 320/2 |
| 5,305,468 | 4/1994 | Bruckert et al. ........................ 455/69 |
| 5,333,175 | 7/1994 | Ariyavisitakul et al. ................. 455/69 |
| 5,566,165 | 10/1996 | Sawahashi et al. .................... 455/38.3 |
| 5,604,050 | 2/1997 | Brunette et al. ........................ 429/97 |
| 5,710,981 | 1/1998 | Kim et al. .............................. 455/127 |
| 5,717,307 | 2/1998 | Barkat et al. ........................... 320/106 |
| 5,794,129 | 8/1998 | Komatsu ................................ 455/522 |
| 5,815,820 | 9/1998 | Kiem et al. ............................ 455/575 |
| 5,857,148 | 1/1999 | Weisshappel et al. ................. 455/575 |

*Primary Examiner*—Paul Loomis
*Assistant Examiner*—George Eng
*Attorney, Agent, or Firm*—John J. Oskorep; Brian M. Mancini

[57] ABSTRACT

A portable radio communication device (102) includes a housing (302), and a transmitter (906) and control circuitry (902) disposed in the housing (302). The housing (302) is configured to carry a first battery source (112) and to optionally simultaneously carry a second battery source (114). The control circuitry (902) configures the transmitter (906) to transmit in accordance with a first set of power levels when the second battery source (114) is available, and in accordance with a second set of power levels when the second battery source (114) is unavailable. The first set of power levels includes at least one power level greater than any of the second set of power levels.

9 Claims, 6 Drawing Sheets

METHOD OF AND APPARATUS FOR CONTROLLING A TRANSMIT POWER OF A COMMUNICATION DEVICE

FIELD OF THE INVENTION

The present invention relates generally to the field of controlling a transmit power of a portable radio communication device.

BACKGROUND OF THE INVENTION

Communication devices, such as mobile stations communicating via radio frequency (RF) signals, are typically portable and powered by removable batteries or battery packs. A removable battery can supply power to a communication device for a limited amount of time which is inversely proportional to an average power consumption of the device. The communication device typically includes a transmitter with a power amplifier consuming a great deal of power from the battery during transmission.

While communication devices have become significantly smaller, the battery has become an increasingly significant contributor to the device's size and weight. Thus, a battery having a small size and weight is often desired. However, such a battery limits the operating time of the communication device and may not be efficient nor otherwise appropriate for use during high power transmission.

Accordingly, there is a need for a communication device that is small in size and weight and capable of meeting high power transmission requirements.

DETAILED DESCRIPTION OF THE PREFERRED EMBODIMENTS

A method of and apparatus for controlling a transmit power of a portable radio communication device in response to the number of battery sources available is disclosed. The portable radio communication device includes a housing, and a transmitter and control circuitry disposed in the housing. The housing is configured to carry a first battery source and to optionally simultaneously carry a second battery source. The control circuitry configures the transmitter to transmit in accordance with a first set of power levels when the second battery source is available, and in accordance with a second set of power levels when the second battery source is unavailable. The first set of power levels includes at least one power level greater than any of the second set of power levels.

Figure 1:
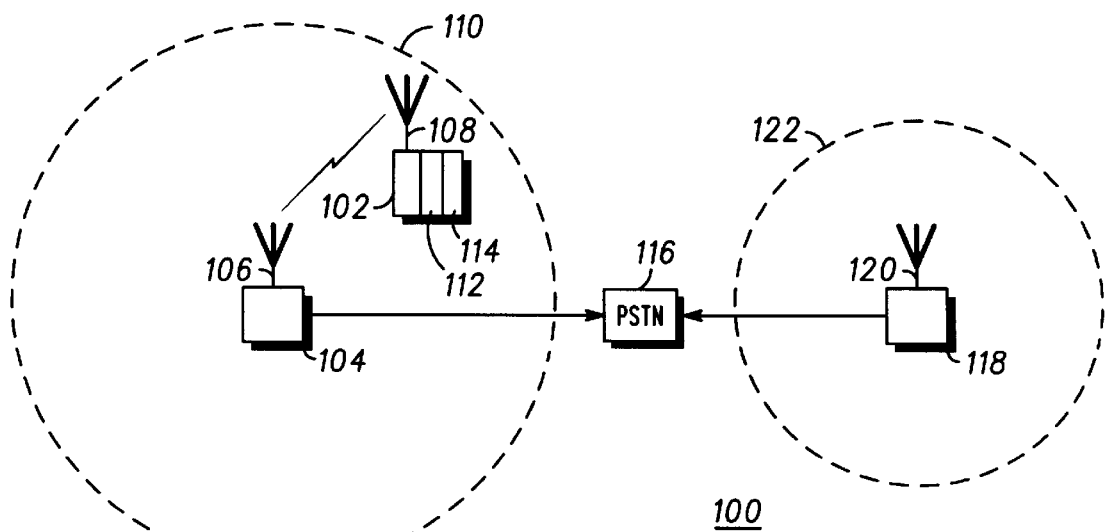
FIG. 1 is a block diagram of a radio communication system including a mobile station and a base station communicating within a coverage area.

FIG. 1 shows a radio communication system 100 including a mobile station 102 and a base station 104. Base station 104 is connected to a public switched telephone network (PSTN) 116. Base station 104 and mobile station 102 have antennas 106 and 108, respectively, and communicate within a coverage area 1 10 via radio frequency (RF) signals. Radio communication system 100 provides wireless communication and features such as paging, telephone, and short messaging features. Mobile station 102 may be generally referred to as a portable radio communication device or a portable radiotelephone.

Figure 2:
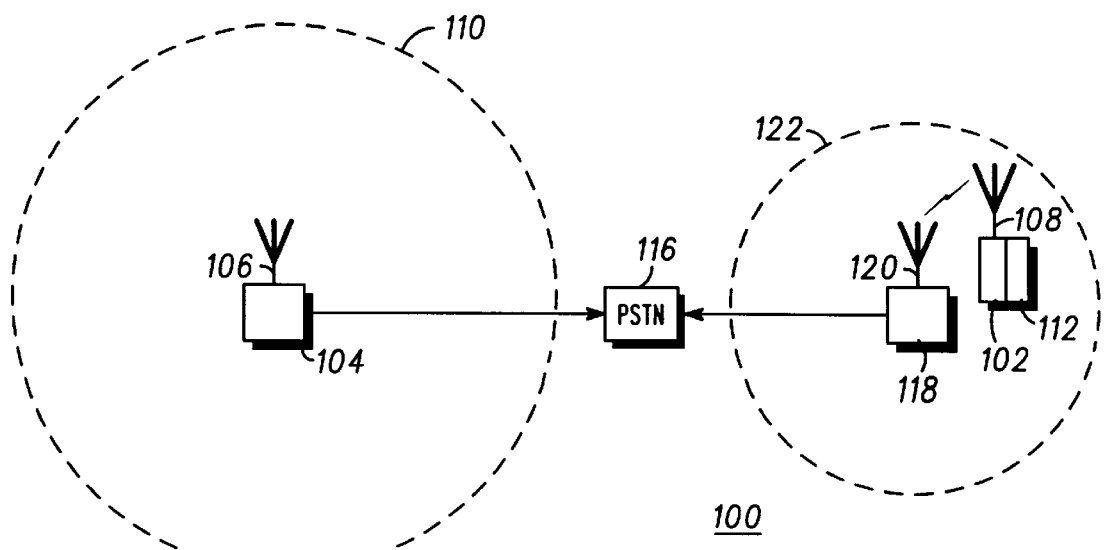
FIG. 2 is a block diagram of the radio communication system including another base station communicating with the mobile station within another coverage area.

Radio communication system 100 may also include a base station 118 having an antenna 120 and connected to PSTN 116. As shown in FIG. 2, mobile station 102 and base station 118 communicate within a coverage area 122 that is smaller than coverage area 110. Preferably, base station 104 is a remote base station suitable for outdoor usage, and base station 118 is a local base station suitable for indoor usage.

Referring back to FIG. 1, mobile station 102 is capable of carrying a battery source 112 and a battery source 114, and has electrical circuitry (shown and described later in relation to FIG. 9) that is powered thereby. Battery source 112 may be referred to as a main battery source of mobile station 102, and battery source 114 may be referred to as an auxiliary battery source or an additional battery source of mobile station 102. When battery sources 112 and 114 are available, mobile station 102 is capable of transmitting within a full range of coverage area 110 (FIG. 1). When battery source 114 is unavailable, mobile station 102 is not capable of transmitting within the full range of coverage area 110, but is capable of transmitting within a limited range of coverage area 110 (relatively close to base station 104) and within a full range of coverage area 122 (FIG. 2).

Figure 3:
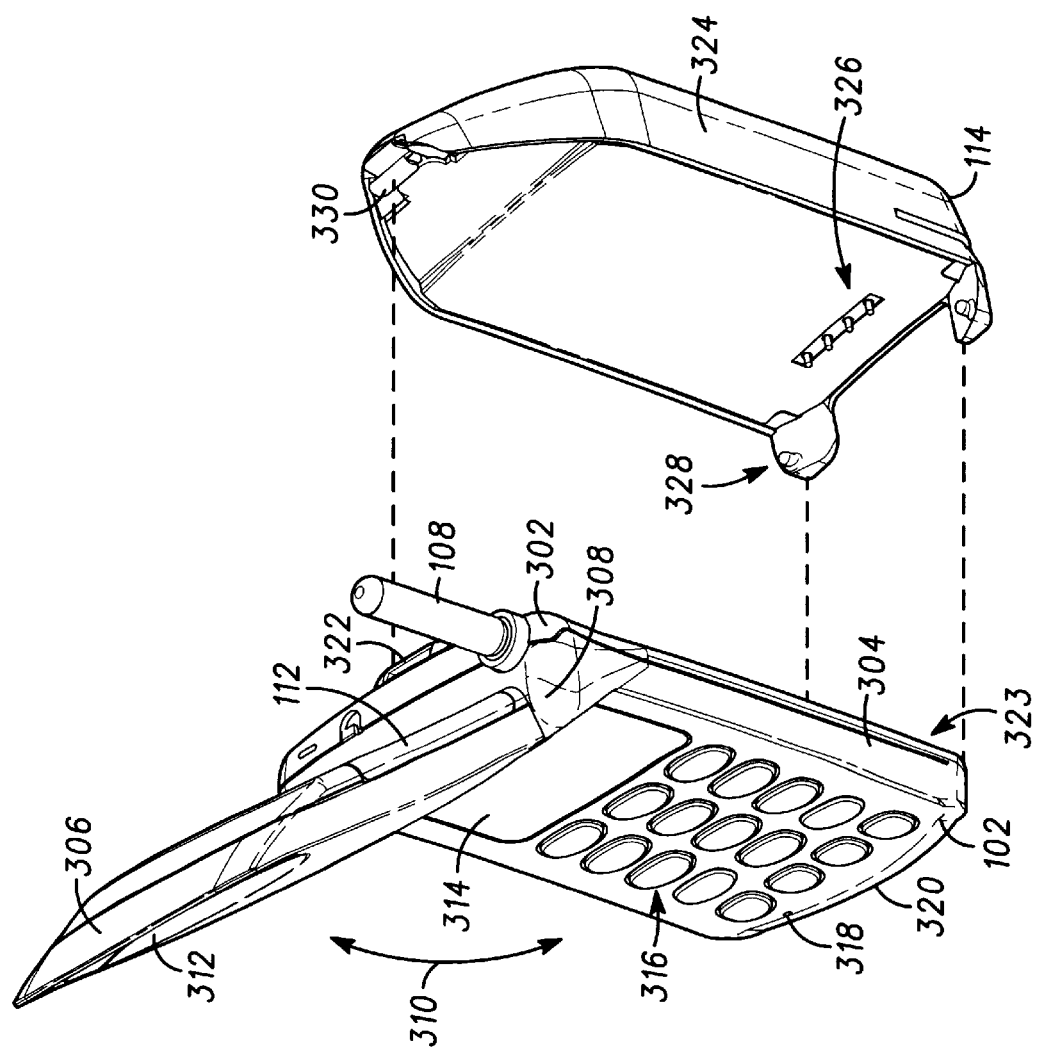
FIG. 3 is an illustration showing a front isometric view of the mobile station, where a main battery source is attached thereto and an auxiliary battery source is unattached.

FIG. 3 shows mobile station 102 in more detail, and also shows battery sources 112 and 114. Mobile station 102 includes a housing 302 having the electrical circuitry disposed therein. Housing 302 includes a lower housing portion 304 and an upper housing portion 306, which are connected together via a hinge 308. Hinge 308 provides rotational movement for upper housing portion 306 in directions indicated by an arrow 310. Thus, upper housing portion 306 may be generally referred to as a movable element or a flap. Mobile station 102 also includes a speaker 312 disposed in upper housing portion 306, a display 314 and a keypad 316 carried on lower housing portion 304, and a microphone 318 disposed in lower housing portion 304. Electrical contacts 323, more visible in FIG. 5, are provided on a rear side of lower housing portion 304.

Figure 5:
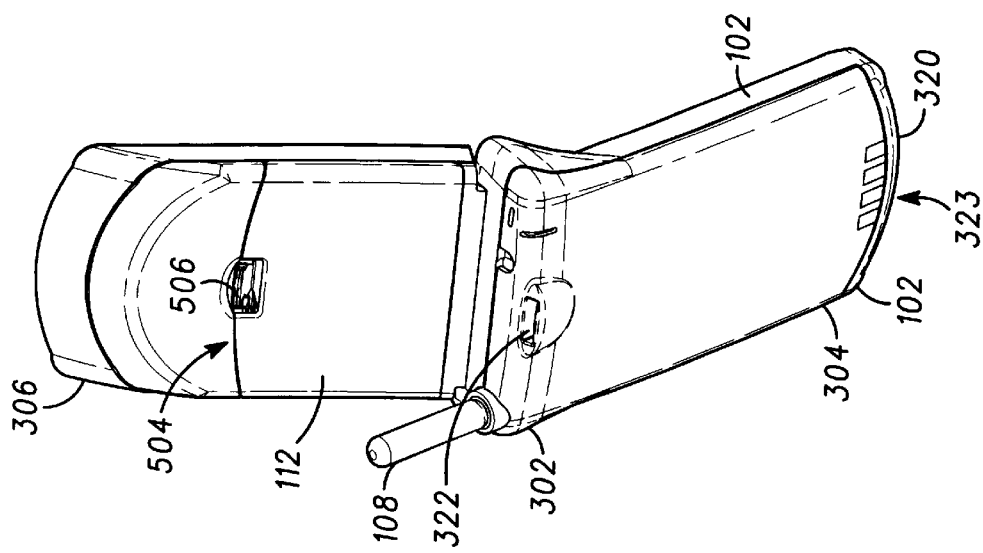
FIG. 5 is an illustration showing a rear isometric view of the mobile station, where the main battery source is attached thereto and the auxiliary battery source is unattached.
Figure 6:
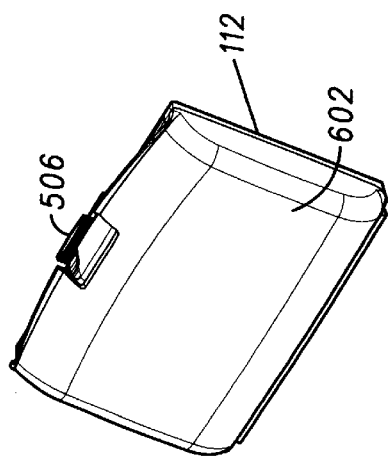
FIG. 6 is an illustration showing a front isometric view of the main battery source.
Figure 7:
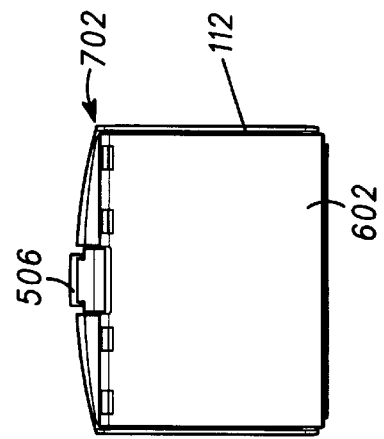
FIG. 7 is an illustration showing a rear plan view of the main battery source.

FIGS. 3 and 5 show battery source 112 carried on upper housing portion 306. As shown in FIGS. 6 and 7, battery source 112 includes a housing 602 having a battery cell or cells and associated circuitry (not visible) disposed therein. The battery cells and associated circuitry are coupled to electrical contacts 702 (FIG. 7) exposed on housing 602.

Figure 8:
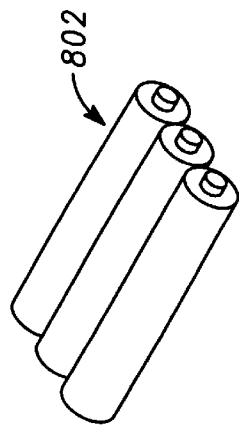
FIG. 8 is an illustration showing AA-size alkaline battery cells as the main battery source of the mobile station.

Equipped with a latching mechanism (FIGS. 5, 6, and 7), battery source 112 is attachable to and detachable from upper housing portion 306, where electrical contacts 702 (FIG. 7) make contact with electrical contacts 504 (FIG. 5). Constructed as described, battery source 112 may be referred to as a battery pack. Alternatively, the main battery source includes only alkaline battery cells, such as AA-size alkaline battery cells 802 shown in FIG. 8.

Referring back to FIG. 3, battery source 114 includes a housing 324 having a battery cell or cells and associated circuitry (not visible) disposed therein. The battery cells and associated circuitry are coupled to electrical contacts 326 exposed on housing 324. Housing 324 defines arms 328 and has a latching mechanism 330 attached thereto. Constructed as described, battery source 114 may be referred to as a battery pack. For carrying battery source 114, lower housing portion 304 defines a bottom side 320 and a slot 322 (shown more clearly in FIG. 5). As shown by the dashed lines of FIG. 3, latching mechanism 330 can be inserted within slot 322 and arms 328 can be positioned underneath bottom side 320. Since latching mechanism 330 is spring-loaded, arms 328 are forcibly retained against bottom side 320 for attachment. Electrical contacts 323 make contact with electrical contacts 326 (FIG. 3).

Figure 4:
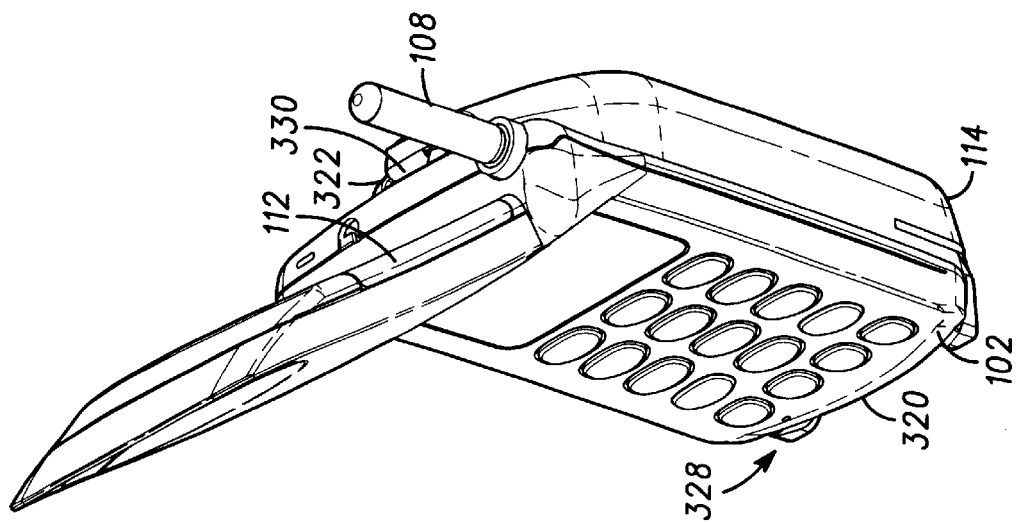
FIG. 4 is an illustration showing a front isometric view of the mobile station, where the main battery source and the auxiliary battery source are simultaneously attached thereto.

Thus, as shown in FIG. 4, mobile station 102 is configured to optionally carry battery source 114 along with battery source 112. As can be seen by comparing FIGS. 3 and 4, mobile station 102 has smaller size when battery source 114 is unattached.

Figure 9:
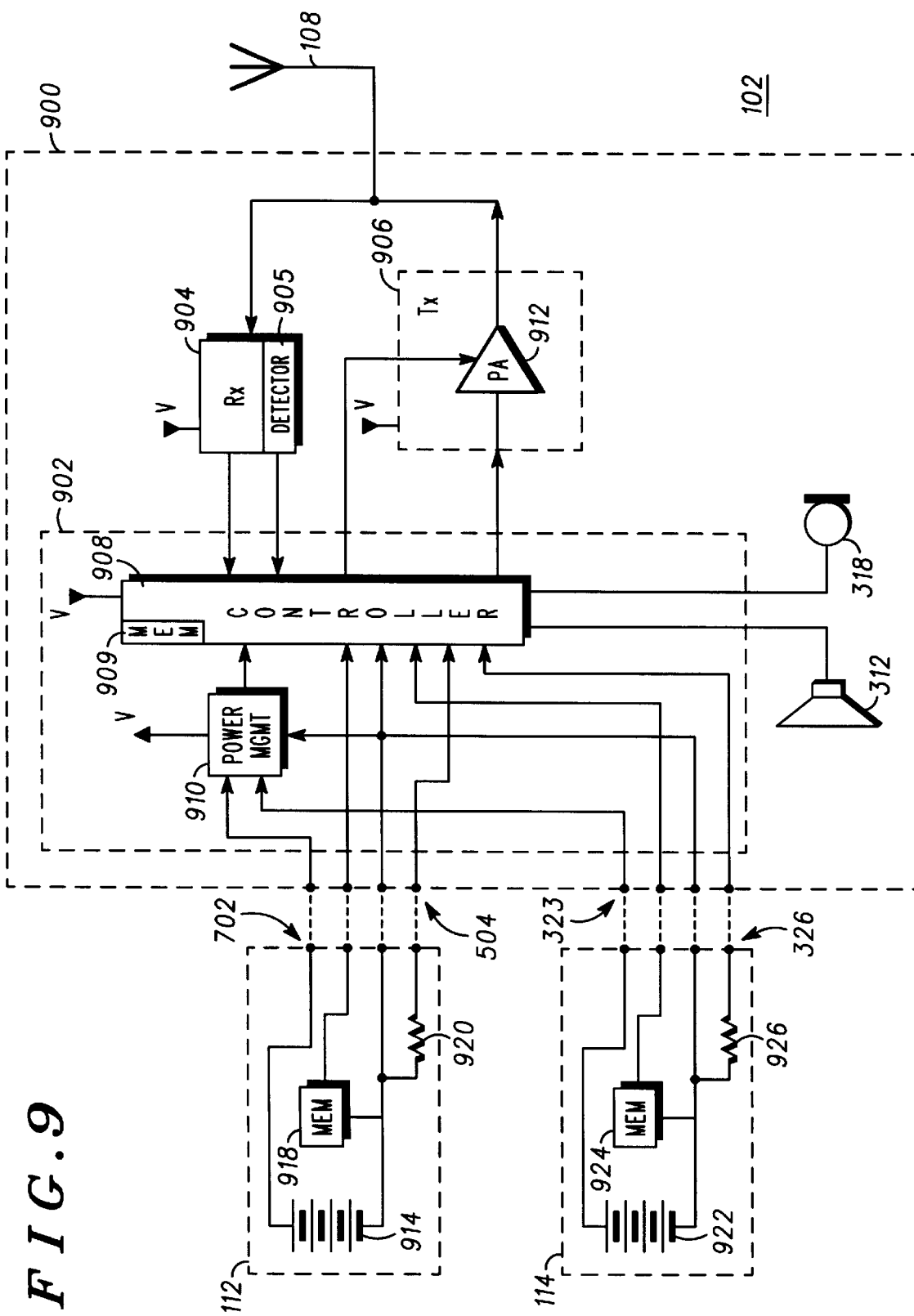
FIG. 9 is a schematic block diagram of electrical circuitry of the mobile station.

FIG. 9 shows a schematic block diagram of electrical circuitry 900 of mobile station 102, and battery sources 112 and 114. Most of electrical circuitry 900 is disposed in lower housing portion 304 on a printed circuit board (PCB). Electrical circuitry 900 includes control circuitry 902, a receiver 904, and a transmitter 906. Control circuitry 902 includes a controller 908 and power management circuitry 910. Controller 908 includes a memory 909, and preferably includes a suitable microprocessor and digital signal processor (DSP). Receiver 904 may include a detector 905 for detecting a quality of the received signals, and is preferably a signal strength detector. Transmitter 906 includes a power amplifier (PA) 912 for transmission.

Battery source 112 includes battery cells 914, a memory 918, and a thermistor 920. Similarly, battery source 114 includes battery cells 922, a memory 924, and a thermistor 926. Preferably, battery source 114 has a equivalent series resistance (ESR) that is less than an ESR of battery source 112. For example, battery source 112 preferably includes AA-size alkaline battery cells 802 (FIG. 8), and battery source 114 preferably includes lithium-ion battery cells.

During typical operation, receiver 904 receives RF signals through antenna 108 and demodulates the RF signals. Controller 908 is coupled to and receives the demodulated information from receiver 904. Such information includes control information and voice information which is processed and sent to speaker 312. Controller 908 is coupled to transmitter 906 and sends information thereto for transmission. Such information includes control information and voice information received from microphone 318. Microphone 318 and speaker 312 are coupled to controller 908 through audio circuitry (not shown).

Figure 10:
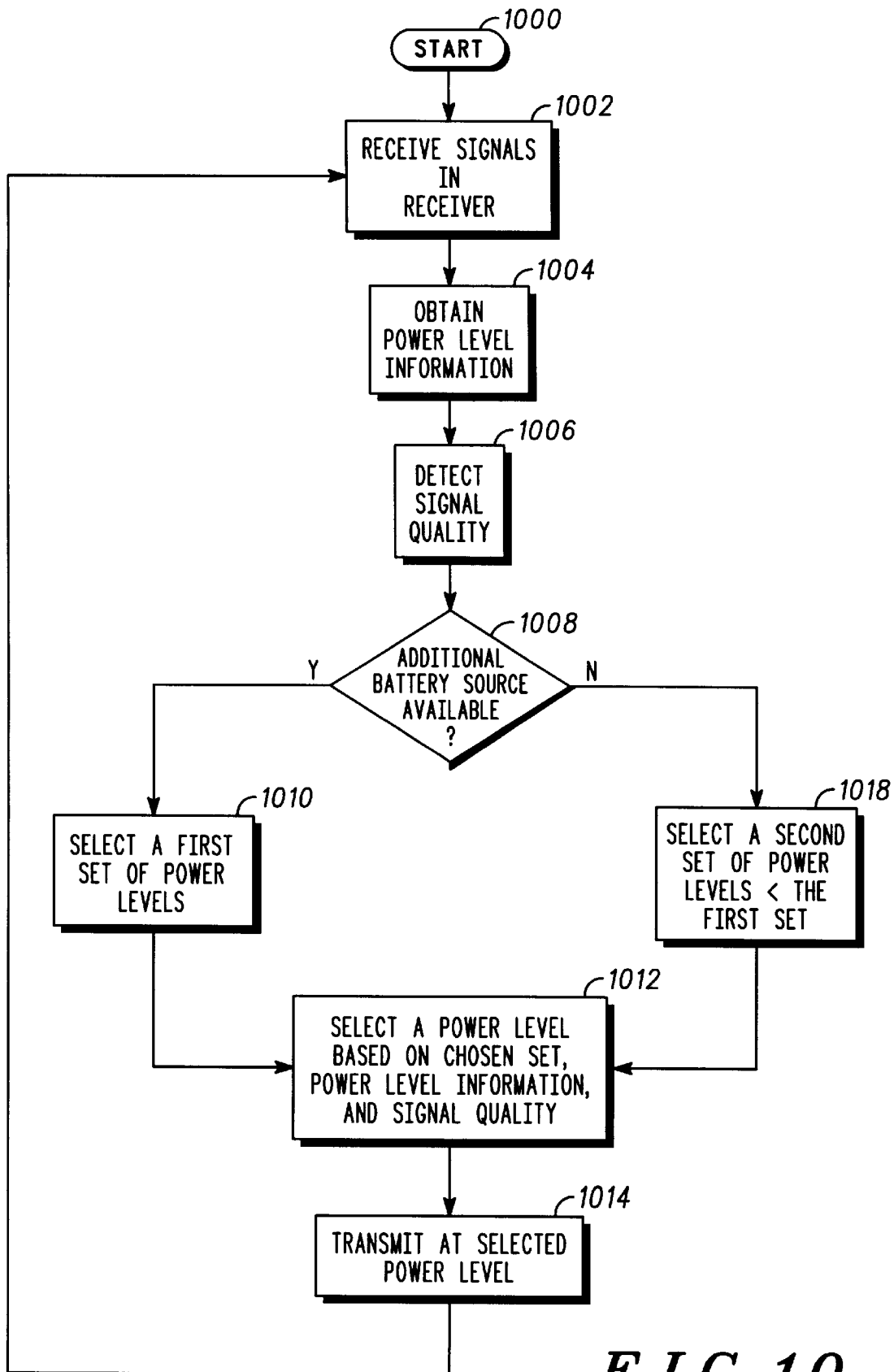
FIG. 10 is a flowchart of a method of controlling a transmit power of the mobile station responsive to the number of battery sources available.

FIG. 10 shows a flowchart of a method of controlling a transmit power in response to the number of battery sources available. Beginning at a start block 1000, mobile station 102 receives RF signals in receiver 904 from one of base stations 104 and 118 (step 1002). The RF signals are modulated with control information, which includes power level information relating to a suitable transmit power level for mobile station 102. Controller 908 obtains this power level information from the RF signals (step 1004) and stores it in memory 909. Mobile station 102 periodically detects a signal strength of the RF signals with detector 905 (step 1006) and stores it in memory 909.

In a conventional mobile station and system, a mobile station configures its transmitter to transmit at a power level corresponding to the power level information, or based on the power level information and the signal strength of the RF signals.

In mobile station 102, control circuitry 902 detects whether battery source 114 is available (step 1008). Battery source 114 is available when it is carried on housing 302 and coupled to electrical circuitry 900. Alternatively, battery source 114 is available when it is carried on housing 302, coupled to electrical circuitry 900, and has sufficient power to provide electrical circuitry 900. Such detection may be accomplished by sensing a voltage of battery source 114, by an actuation of a mechanical switch, or by other suitable means.

Mobile station 102 transmits in accordance with a first set of power levels or a second set of power levels. The first set of power levels includes at least one power level greater than any of the second set of power levels. If battery source 114 is available, controller 908 selects the first set of power levels (step 1010). Here, electrical circuitry 900 is powered from battery source 112, battery source 114, or both. Preferably here, electrical circuitry 900 is powered from battery source 114 if sufficient power is available therefrom. If battery source 114 is unavailable, controller 908 selects the second set of power levels (step 1018). Here, electrical circuitry 900 is powered from battery source 112.

Controller 908 selects a transmit power level for PA 912 based on the selected set of power levels, the power level information, and the signal quality (step 1012). Alternatively, controller selects the transmit power level based only on the selected set of power levels and the power level information. Finally, transmitter 906 transmits at the selected transmit power level (step 1014). The method may continue back at step 1002.

Preferably, the second set of power levels is a lower subset of the first set. For example, if the first set of power levels includes power levels one through ten, the second set of power levels may include power levels one through six.

Also preferably, the first set of power levels substantially corresponds to the power level information received as in conventional methods. That is, when mobile station 102 is simultaneously carrying battery sources 112 and 114 and operating within coverage area 110, mobile station 102 selects a first set of power levels that corresponds to all possible power levels of the power level information from base station 104. When battery source 114 is unavailable, however, controller 908 selects a second set of power levels that excludes at least one higher power level of the first set, thereby limiting transmitter 906 and ignoring the power level information corresponding to higher power levels of the first set.

Thus, transmitter 906 transmits at a first power level no greater than a first maximum power level when battery source 114 is available, and transmits at a second power level no greater than a second maximum power level when battery source 114 is unavailable, where the second maximum power level is less than the first maximum power level.

For illustration purposes, the first maximum power level is set to 29 dBm and the second maximum power level is set to 17 dBm. An operating current required by transmitter 906 can be calculated using the following equation:

$$I=P/(e*V),$$

where

I is the operating current of transmitter 906,

P is an output power of transmitter 906, e is an efficiency of transmitter 906, and V is an operating voltage of transmitter 906.

Where e=50% and V=1.8 volts, transmitter 906 requires 883 milliamperes (mA) of current for transmission at the first maximum power level, but only 56 mA of current at the second maximum power level. By limiting the output power, then, the current required to operate transmitter 906 is greatly reduced. Mobile station 102 can now make use of a main battery source that would otherwise be incapable of powering mobile station 102 at the first maximum power level.

Figure 11:
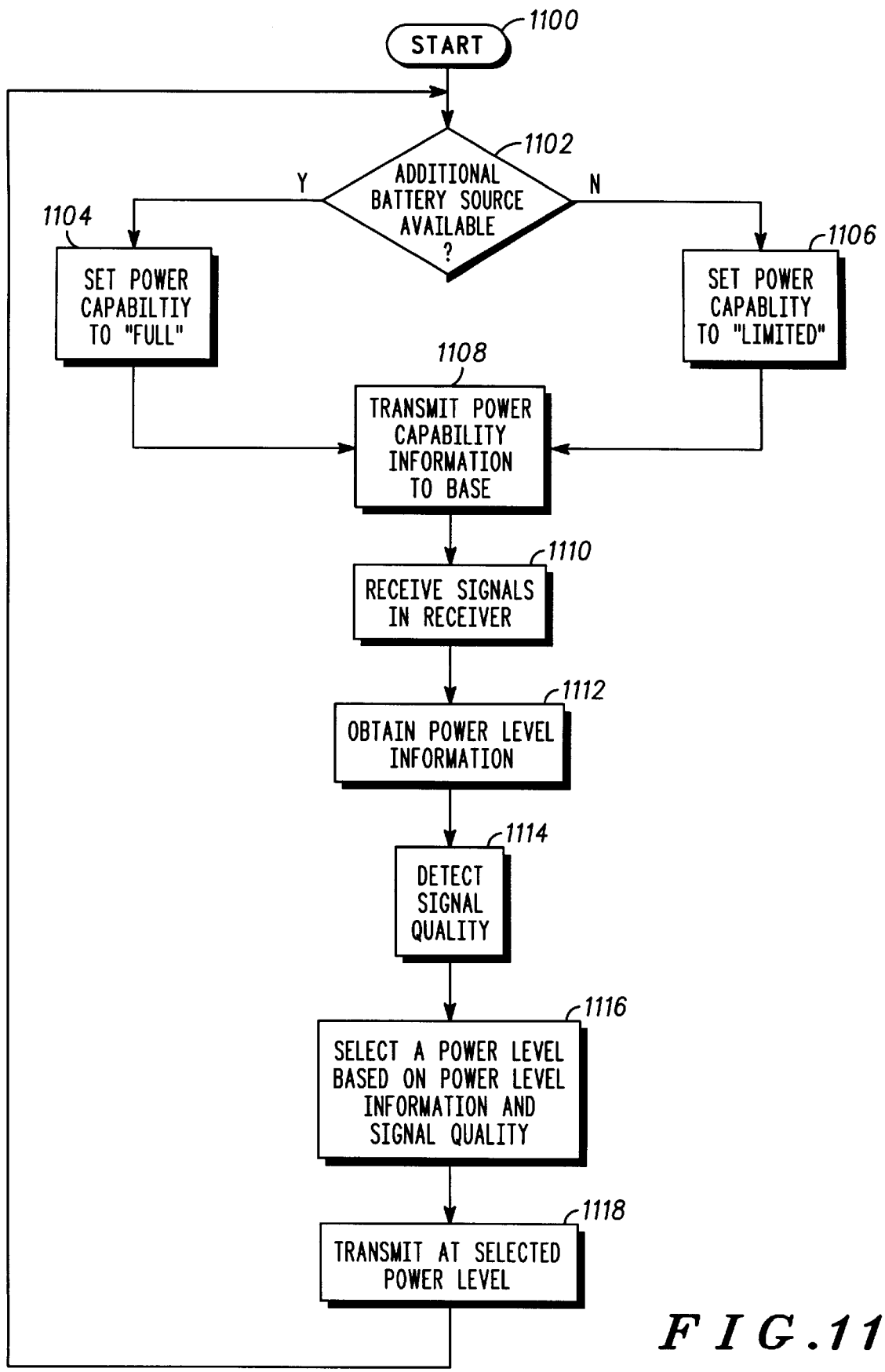
FIG. 11 is a flowchart of an alternate method of controlling the transmit power of the mobile station responsive to the number of battery sources available.

FIG. 11 is a flowchart of an alternate method of controlling a transmit power of mobile station 102. Starting at a start block 1100, control circuitry 902 detects whether battery source 114 is available (step 1102). Next, controller 908 generates information based on the availability of battery source 114. For example, controller 908 sets power capability information=FULL if battery source 114 is available (step 1104), and sets the power capability information=LIMITED if battery source 114 is unavailable (step 1106). Mobile station 102 transmits the power capability information to base station 104 (step 1108), where base station 104 selects one of the first and the second set of power levels and generates the power level information in accordance therewith. Base station 104 transmits the RF signals having the power level information, and mobile station 102 receives the RF signals (step 1 110) and obtains the power level information (step 1112) and stores it in memory 909. Detector 905 may detect a quality of the RF signals (step 1114) and store it in memory 909. Controller 908 determines a power level based on the power level information and the signal quality (step 1116), or alternatively determines the power level based only on the power level information. Finally, transmitter 906 transmits at the selected power level (step 1118). Thus, in the alternate embodiment, base station 104 selects the first or the second set of power levels (or similarly the first and the second maximum power levels).

As described herein, a portable radio communication device having a transmit power responsive to the number of battery sources available is disclosed. The device has a particular size and weight for operating in the full range of coverage area 110 (remote setting) as described in relation to FIG. 1, and has a smaller size and weight for operating in the limited range of coverage area 110 or the full range of coverage area 122 (local setting) as described in relation to FIG. 2. Mobile station 102 is preferably configured to receive and operate from a main battery source that includes small and inexpensive battery cells, such as alkaline battery cells which typically have higher ESRs, where the methods described herein increase the efficiency and the life of the main battery source and operating time of mobile station 102.

While particular embodiments of the present invention have been shown and described, modifications may be made. It is therefore intended in the appended claims to cover all such changes and modifications which fall within the true spirit and scope of the invention.

What is claimed is:

1. A method of controlling a transmit power of a portable radio communication device, the portable radio communication device including a transmitter, a receiver and control circuitry, the portable radio communication device configured to carry a portable battery source and to optionally simultaneously carry an additional portable battery source, the method comprising the steps of:

generating information based on the availability of the additional portable battery source;

transmitting the information to a base station;

when the information indicates that the additional portable battery source is available, the base station sending power level information including an appropriate power level for transmitting including one of a first power level no greater than a first maximum power level and a second power level no greater than a second maximum power level being less than the first maximum power level, and when the information indicates that the additional portable battery source is not available, the base station sending power level information including an appropriate power level for transmitting including a second power level no greater than a second maximum power level being less than a first maximum power level;

receiving signals from the base station including a signal having the power level information indicating the appropriate power level for transmitting; and transmitting at the appropriate power level.

2. The method according to claim 1, wherein before the transmitting at the appropriate power step further comprising the steps of:

measuring a signal quality of at least one of the signals from the receiving step; and determining the appropriate power level for transmitting based on the power level information from the receiving step and the signal quality from the measuring step.

3. A portable radio communication device, comprising:

a housing, said housing configured to carry a first portable battery source and to optionally simultaneously carry a second portable battery source;

a transmitter and a receiver disposed in said housing; and control circuitry, said control circuitry disposed in said housing and coupled to said receiver and said transmitter, said control circuitry to detect an availability of a second portable battery source and to direct the transmitter to transmit the availability to a base station, said receiver adapted to receive signals from the base station including a signal having power level information, wherein when the availability indicated that the additional portable battery source is available, the power level information includes an appropriate power level including one of a first power level no greater than a first maximum power level and a second power level no greater than a second maximum power level being less than the first maximum power level, and when the availability indicated that the additional portable battery source is not available, the power level information includes an appropriate power level including a second power level no greater than a second maximum power level being less than a first maximum power level, said control circuitry to configure said transmitter to transmit in accordance with the appropriate power level.

4. The portable radio communication device according to claim 3, wherein the first battery source has a first equivalent series resistance (ESR) and the second battery source has a second ESR that is less than the first ESR, and wherein said transmitter is supplied power from the first battery source when the second battery source is unavailable.

5. The portable radio communication device according to claim 3, wherein the first battery source comprises a first battery pack having at least a first battery cell disposed therein and the second battery source comprises a second battery pack having at least a second battery cell disposed therein, and wherein said housing is configured to attach with the first and the second battery packs.

6. The portable radio communication device according to claim 3, further comprising:

a detector, said detector coupled to said receiver, said detector to detect a quality of a received signal for use in determining the appropriate power level for the transmitter based on the power level information and the quality of the received signal.

7. A portable radiotelephone, comprising:

a housing, said housing configured to carry a portable main battery source and to optionally simultaneously carry a portable auxiliary battery source;

electrical circuitry, said electrical circuitry disposed in said housing and electrically operating from at least one of the portable main battery source and the portable auxiliary battery source, said electrical circuitry including:

a receiver, said receiver including a detector, said detector to detect a quality of a received signal;

a transmitter, said transmitter including a power amplifier (PA);

control circuitry, said control circuitry coupled to said receiver and to said transmitter, said control circuitry to detect an availability of the portable auxiliary battery source and to direct the transmitter to transmit the availability to a base station, said receiver adapted to receive signals from the base station including a signal having power level information, wherein when the availability indicated that the additional portable battery source is available, the power level information includes an appropriate power level including one of a first power level no greater than a first maximum power level and a second power level no greater than a second maximum power level being less than the first maximum power level, and when the availability indicated that the additional portable battery source is not available, the power level information includes an appropriate power level including a second power level no greater than a second maximum power level being less than a first maximum power level, said control circuitry to configure said PA to transmit in accordance with the appropriate power level based on the power level information and the quality of the received signal; and an antenna, said antenna carried on said housing and coupled to said receiver and said PA.

8. The portable radiotelephone according to claim 7, wherein the main battery source has a first equivalent series resistance (ESR) and the auxiliary battery source has a second ESR that is less than the first ESR, and wherein said PA is supplied power from the main battery source when the auxiliary battery source is unavailable.

9. The portable radiotelephone according to claim 7, wherein the main battery source includes a first battery pack having at least a first battery cell disposed therein and the auxiliary battery source includes a second battery pack having at least a second battery cell disposed therein, and wherein said housing is configured to attach with the first and the second battery packs.

* * * * *